Feb. 27, 1962  J. G. BAKER  3,022,708
CORRECTING OPTICAL SYSTEM
Filed Dec. 16, 1957  2 Sheets-Sheet 1

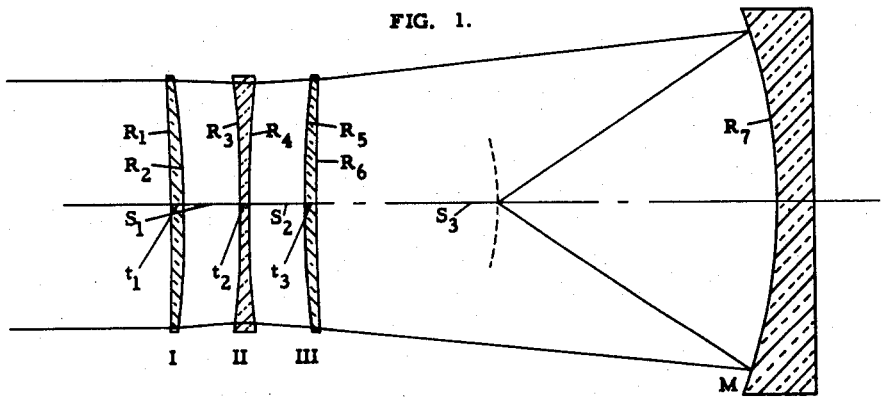

FIG. 1.

| EXAMPLE 1 | | f/1.0 | f = 1.000 |
|---|---|---|---|
| LENS | GLASS | RADII* | THICKNESSES |
| | $N_D$   V | | |
| I | 1.5497   45.8 | $R_1$ = −21.014<br>$R_2$ = −5.782 | $t_1$ = 0.053<br>$S_1$ = 0.216 |
| II | 1.6110   58.8 | $R_3$ = −6.436<br>$R_4$ = 6.436 | $t_2$ = 0.032<br>$S_2$ = 0.216 |
| III | 1.5497   45.8 | $R_5$ = 5.782<br>$R_6$ = 21.014 | $t_3$ = 0.053<br>$S_3$ = 1.832 |
| M | | $R_7$ = −2.1014 | |

\* $R_1$, $R_6$, and $R_7$ in this example are spherical; $R_2$, $R_3$, $R_4$, and $R_5$ are contact or central radii only and are predominantly aspheric.

The equations of the cross-sections are:

Surface 2)
$$\xi_2 = -5.782 + \sqrt{(-5.782)^2 - \eta_2^2} \quad -0.064857\,\eta_2^4 \quad +0.004165\,\eta_2^6$$

Surface 3)
$$\xi_3 = -6.436 + \sqrt{(-6.436)^2 - \eta_3^2} \quad -0.091781\,\eta_3^4 \quad -0.014388\,\eta_3^6 \quad -0.008684\,\eta_3^8$$

Surface 4)
$$\xi_4 = +6.436 - \sqrt{(6.436)^2 - \eta_4^2} \quad +0.091781\,\eta_4^4 \quad +0.014388\,\eta_4^6 \quad +0.008684\,\eta_4^8$$

Surface 5)
$$\xi_5 = +5.782 - \sqrt{(5.782)^2 - \eta_5^2} \quad +0.064857\,\eta_5^4 \quad -0.004165\,\eta_5^6$$

Fundamental Ratio: $\beta_2/\beta_3 = 0.707$
$\beta_5/\beta_4 = 0.707$

Inventor:
James G. Baker,
By Emery, Booth, Townsend, Miller & Weidner
Attys

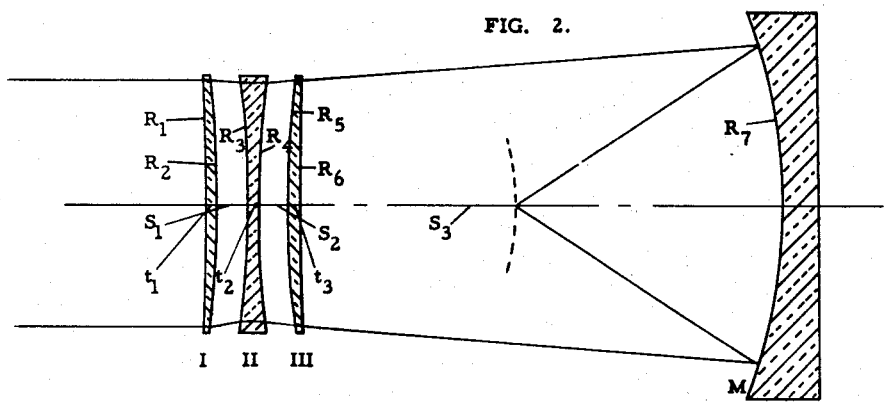

FIG. 2.

| EXAMPLE 2 | | | f/1.0 | f = 1.000 |
|---|---|---|---|---|
| LENS | GLASS | | RADII * | THICKNESSES |
| | $N_D$ | V | | |
| I | 1.55772 | 53.83 | $R_1$ = -25.63<br>$R_2$ = -5.343 | $t_1$ = 0.051<br>$S_1$ = 0.103 |
| II | 1.60302 | 60.67 | $R_3$ = -6.290<br>$R_4$ = 6.290 | $t_2$ = 0.031<br>$S_2$ = 0.103 |
| III | 1.55772 | 53.83 | $R_5$ = 5.343<br>$R_6$ = 25.63 | $t_3$ = 0.051<br>$S_3$ = 1.902 |
| M | | | $R_7$ = -2.0505 | |

\* $R_1$, $R_6$, and $R_7$ in this example are spherical; $R_2$, $R_3$, $R_4$, and $R_5$ are contact or central radii only and are predominantly aspheric.

The equations of the cross-sections are:

Surface 2)
$$\xi_2 = -5.343 + \sqrt{(-5.343)^2 - \eta_2^2} \quad -0.151002\,\eta_2^4 + 0.047280\,\eta_2^6$$

Surface 3)
$$\xi_3 = -6.290 + \sqrt{(-6.290)^2 - \eta_3^2} \quad -0.172961\,\eta_3^4 + 0.021018\,\eta_3^6$$

Surface 4)
$$\xi_4 = +6.290 - \sqrt{(6.290)^2 - \eta_4^2} \quad +0.172961\,\eta_4^4 - 0.021018\,\eta_4^6$$

Surface 5)
$$\xi_5 = +5.343 - \sqrt{(5.343)^2 - \eta_5^2} \quad +0.151002\,\eta_5^4 - 0.047280\,\eta_5^6$$

Fundamental Ratios: $\beta_2/\beta_3$ = 0.873

$\beta_5/\beta_4$ = 0.873

*Inventor:*
*James G. Baker,*
*by Emery, Booth, Townsend, Miller & Weidner*
*Attys*

United States Patent Office 3,022,708
Patented Feb. 27, 1962

3,022,708
CORRECTING OPTICAL SYSTEM
James G. Baker, 7 Grove St., Winchester, Mass.
Filed Dec. 16, 1957, Ser. No. 702,952
20 Claims. (Cl. 88—57)

This invention relates to optical systems. It aims to provide such system capable of delivering a highly corrected image field at speeds and field angles normally associated with lens systems having a great many elements. It has among its objects to provide such optical system having important application to the photographing of fast moving celestial objects or artificial satellites as well as to other fields of use including television projection, clinical X-ray photography, night aerial photography and other adaptations.

In the accompanying drawings are illustrated two embodiments and examples of the invention, wherein:

FIG. 1 shows a primary spherical element and a correcting group of elements corresponding to Example 1 wherein standard crown and flint glass types are paired; and FIG. 2 shows another embodiment wherein the correcting element group involves "apochromatic pairing" of certain glass types.

For many years the Schmidt camera has been thought of as a standard of excellence in optical performance for a variety of applications where a combination of high speed, wide field and efficient light transmission is involved. That optical construction first introduced by Schmidt in Hamburg, having a weak aspheric correcting plate located at the center of curvature of a spherical mirror still remains as the simplest optical system capable of delivering a highly corrected image field at speeds and field angles otherwise attainable only with relatively complex lens systems containing many elements. For this reason those skilled in the art think of this now elementary construction as the "classical Schmidt camera" or system whereby is meant a simple aspheric correcting plate or element at the center of curvature of a spherical mirror.

The classical Schmidt camera is capable of giving image quality satisfactory for critical scientific applications down to speeds of $f/1$, for field angles of 5 degrees off-axis and for color ranges from blue to red, or from violet to blue, provided the focal length is short, say, of the order of 12 inches or smaller. If the field angle or focal length is increased, it then becomes necessary to restrict the speed. For example, critical performance might be obtained at $f/1.5$ over a field of 10 degrees off-axis for a focal length of 20 inches or over a field of 5 degrees off-axis for a focal length of 30 inches, etc. Even so, in stellar photography a high percentage of the light would not lie in a sufficiently small circle of confusion on the emulsion of a photographic film in the image surface to give high efficiency and faint limiting magnitude. Again, if the spectral range being photographed is increased, say, from the near ultra-violet to the deep red, or to the infrared, it becomes necessary to restrict the geometrical speed to $f/1.5$ or slower if efficiency and critical scientific performance are still to be retained.

Thus, the classical Schmidt camera still is noticeably deficient if large, fast cameras covering a wide angular field and utilizing a large spectral range are required. For example, the classical Schmidt camera at f/1.0 covering a field of 15 degrees off-axis (30 degree total field) with a spectral range of the near ultra-violet to the infra-red, gives unacceptably bad images in the outer field and even on-axis the outlying colors are poorly focused. This means in stellar photography that only a portion of the light from a given off-axis star is focused into a usable image. At the edge of the field perhaps only 5 or 10 percent of the light is actually utilized and the remainder lies around the core of the image as a flare of unfocused and wasted light.

Recently a need has arisen for highly corrected optical systems that can photograph fast moving celestial objects or artificial satellites which intrinsically are star-like in appearance among the fixed stars for an instantaneous exposure but which are meteor-like in their rapid angular motions across the sky. If point-like images are to be obtained, either the exposure time must be very short, or the camera must track the known motion of the object, or both. If the motion of the object is unknown, and the camera is to be used to detect its exitsence, then indeed the optical system must yield critically focused light from a large aperture and over a wide spectral range to allow short unguided exposures to be used. At the same time the field of view must be great if the chances of discovery are to be sufficient.

Thus, the requirements of an optical system for satellite tracking and discovery are extreme, lying at the frontiers of the art. It is true that modified Schmidt systems do exist that have satisfactory image quality, as for example, the so-called "Super-Schmidt" cameras of applicant's design, in which connection reference is made to Baker Patent No. 2,458,132 of January 4, 1949. However, the optical systems therein employ concentrically curved shells that are practicable only for short focal lengths. Indeed, the only large Super-Schmidt cameras in existence so far as known to applicant have a focal length of only 8 inches. On the other hand, high precision is sought also in the task of tracking artificial satellites, which leads to a need for focal lengths as large as practicable.

Hence for a satellite tracking camera the optical requirements are in the nature of a speed of about $f/1.0$ or faster, a field of view of about 30 degrees total or more, a spectral range from the near ultra-violet to the infrared, an image quality of a circle of confusion of about 25 microns or smaller, for at least about 80 percent of the light energy being photographed, or better, over the entire field of view. The efficiency must also be maximum, a consideration that rules out the use of even one thick shell as would be required in a Super-Schmidt camera of focal lengths of 20 inches or more. Indeed, such a shell might have to be 6 inches thick for a 20-inch focal length camera, if the shell is to be effective optically, and in such a thickness very little violet or ultra-violet light would get through. Such a glass shell is difficult or impossible to obtain from existing glass-making facilities.

While the optical needs for tracking artificial satellites are extreme, other applications also require such improved optical systems. For example, projection television in times past has made use of the classical Schmidt, in small sizes of the Super-Schmidt system and other forms, but in general the performance has been marginal. It may be that the repeated efforts at projection television, for home and theatre, have led to such mediocre results that in recent years these have been abandoned in favor of simply larger image tubes, or in theatres the screens are not adequately sharp or adequately illuminated. In addition, the image contrast is poor.

Similarly, clinical X-ray photography requires improved optical systems of greater speed that will permit shorter exposure of the patient to X-rays or to weaker X-rays, and which will permit the rapid processing of scores of patients on small film formats but with critically sharp images.

Night aerial photography also needs longer focal length, faster optical systems of critical performance, to permit night pictures to be taken from high altitude. In fact, the optical systems needed for such an application must be of the highest quality in every way if the conditions of high altitude, low contrast, absence of shadows, and low level of illumination are to be successfully countered. There also are applications in science, medicine, entertainment, and in the military where the improved form of optical system of the present invention will be useful.

With the foregoing by way of introduction, it will be understood that in one aspect this invention affords an improved Schmidt system that retains most of the advantages of the classical Schmidt while overcoming the optical deficiencies of the latter in a practicable way. The resulting new form of Schmidt camera may be utilized wherever long focal length, high speed, great spectral range, efficient transmission, and wide angular fields must all be combined in a single instrument.

It is deemed helpful for the purposes of disclosure of the present invention here to state briefly the deficiencies of the classical Schmidt, as recognized by those versed in the art. These include: (1) the simple figured aspheric correcting, even with the well-known central bulge, has residual chromatic aberration which can become serious for very fast cameras and/or for great spectral ranges; (2) the fore-shortening of oblique bundles causes any given zone of the correcting plate to correct too low a zone height on the mirror, which leads to a combination of under-corrected astigmatism and over-corrected oblique spherical aberration for large off-axis angles in the meridional plane; (3) the optical power of any given zone of the aspheric correcting plate is increased by oblique refraction, since the ray is refracted at angles considerably removed from the condition of minimum deviation for the equivalent prism of the zone.

In general the deficiencies (2) and (3) above can be grouped together to say that the classical Schmidt has some residual astigmation of the third order (Seidel astigmatism) which is of fifth order magnitude, and that it also has oblique spherical aberration in both the radial and tangential directions. Oblique spherical aberration is the reappearance of spherical aberrations in the off-axis bundles, even where the on-axis bundle many be 100 percent corrected, and may be of differing magnitude in the radial and tangential directions, leading to an elliptical-type aberration. There are various other ways of describing these residual aberrations but basically the correcting plate is too strong for oblique angles.

After many calculations and physical considerations applicant has discovered that the simple Schmidt plate can be replaced by a trio of correcting plates or lens elements approximately symmetrically arranged which when properly designed can be corrected for color aberrations, both longituidnal and transverse, and for oblique spherical aberration without destroying its basic ability, as in the case of the ordinary classical Schmidt arrangement, to eliminate the unsymmetrical transverse aberrations of coma and coma-like errors. Such trio of correcting plates in a single cell behaves like a classical Schmidt correcting plate made up in this instance of two aspheric plates, cemented together, for purposes of color correction only for on-axis rays, but off-axis is decidedly weaker in optical power than the classical Schmidt plate at the same angle. Indeed where the classical Schmidt plate grows stronger zone by zone for oblique bundles, this trio of plates grows actually weaker, as is required to compensate for the fore-shortening of oblique tangential rays. With prolonged experiment it has proved possible to balance the correction over a wide field of view, great spectral range, and for a speed of $f/1.0$ and focal length of 20 inches, as required for a certain type of satellite tracking camera. The correction is by no means limited to these figures, and the trio of plates or elements may be used in much greater diameters, for longer and shorter focal lengths, and for even larger fields of view, according to the use application. In any event the trio of plates or correcting members in combination with a spherical mirror give a highly corrected image importantly superior to that given by the classical Schmidt at the same off-axis point under the same conditions.

It will be understood that the improved correction is not had by any random combination of aspheric plates. To the contrary, the correction for the oblique spherical aberration is obtained only by a controlled difference between large refractions purposely introduced. The aspheric figured departure of the outer aspheric plates from the nearest spherically surfaced lens elements is substantial, in the order of many times more than required for the simple Schmidt plate. In other words, the collective on-axis power aspherically of the trio of plates is held to be equal to that of the classical Schmidt plate, but off-axis the trio is weaker whereas the classical plate is stronger, the negative trend of the central plate for oblique refraction being more than off-set by the positive refraction at the outer plate. This positive refraction is enhanced by the air-space, which permits a kind of "lever arm" for the opposing refraction. This in turn depends critically on the adopted aspheric shapes.

Because relatively large aspheric optical powers are purposely introduced to effect the oblique correction, it is important to keep the longitudinal color aberration fully corrected by appropriate combination of crown and flint elements. The considerations for color correction are similar as for ordinary lens elements except that in my present improved system the difference of the V-values is purposely kept small. Since this V-value difference generally is much smaller than normally employed, it becomes fully feasible to introduce "apochromatic" glass pairings from the few such combinations available.

Thus in Example 1 hereof I have represented an optical design for a pairing of standard crown and flint types, where the crown is used in the central element and the flints are used in the outlying elements, substantially symmetrically around the crown, while in Example 2 there is an "apochromatic pairing" of glass types, by which is meant the combination of glass types having similar partial dispersions such that outlying spectral regions can be nearly as well corrected as standard glass combinations accomplish for more restricted spectral regions around a chosen mean color of the spectrum.

For convenient reference the correcting elements, plates or lenses of the two illustrative embodiments of the invention are here given together.

In the following tabular descriptions and elsewhere in the present disclosure the symbols employed generally conform to accepted usage in optical literature. Thus $N_D$ is the index of refraction for the D-line of the spectrum, that is, the mean color of the sodium pair of lines in the orange-yellow, or 5893 angstroms. V is the reciprocal dispersion of the glass. $t_{1,2}$, etc. is the axial thickness of element 1, 2, etc., and $S_1$, $S_2$, etc. is the axial air space. This will be further apparent from the subsequent discussion of and equation for the aspheric surfaces.

*Example 1*

$[f/1.0 \quad f=1.000]$

| Lens | Glass | | Radii[1] | Thicknesses |
|---|---|---|---|---|
| | $N_D$ | V | | |
| I | 1.5497 | 45.8 | $R_1=-21.014$ | $t_1=0.053$ |
| | | | $R_2=-5.782$ | $S_1=0.216$ |
| | | | $R_3=-6.436$ | $t_2=0.032$ |
| II | 1.6110 | 58.8 | | |
| | | | $R_4=\phantom{-}6.436$ | $S_2=0.216$ |
| | | | $R_5=\phantom{-}5.782$ | $t_3=0.053$ |
| III | 1.5497 | 45.8 | | |
| | | | $R_6=\phantom{-}21.014$ | $S_3=1.832$ |
| M | | | $R_7=-2.1014$ | |

[1] $R_1$, $R_6$ and $R_7$ in this example are spherical; $R_2$, $R_3$, $R_4$ and $R_5$ are contact or central radii only and are predominantly aspheric.

This Example 1 system is of standard glass types and provides an "achromatic" type of solution. The air spaces are fairly large, the aspheric powers rather moderate, with the residual aberrations of higher order arising from refractions on the outer flint correcting elements at zone heights that are too large because of the large air spaces used, where large off-axis angles are involved. Nevertheless, the performance of Example 1 is much superior to that of the classical Schmidt over field, aperture and spectrum. This Example 1 demonstrates a form of the invention where the ultimate correction is not required, and where moderate aspheric powers and standard glass types are used to minimize cost and difficulty of fabrication.

*Example 2*

[f/1.0  f=1.000]

| Lens | Glass | | Radii[1] | Thicknesses |
|---|---|---|---|---|
| | $N_D$ | V | | |
| I | 1.55772 | 53.83 | $R_1=-25.63$ | $t_1=0.051$ |
| | | | $R_2=-5.343$ | $S_1=0.103$ |
| II | 1.60302 | 60.67 | $R_3=-6.290$ | $t_2=0.031$ |
| | | | $R_4=\phantom{-}6.290$ | $S_2=0.103$ |
| | | | $R_5=\phantom{-}5.343$ | $t_3=0.051$ |
| III | 1.55772 | 53.83 | | |
| M | | | $R_6=\phantom{-}25.63$ | $S_3=1.902$ |
| | | | $R_7=-2.0505$ | |

[1] $R_1$, $R_6$ and $R_7$ in this example are spherical; $R_2$, $R_3$, $R_4$ and $R_5$ are contact or central radii only and are predominantly aspheric.

This Example 2 is of selected glass types and provides an "apochromatic" type of solution. The air spaces are now smaller than for Example 1, the aspheric powers more pronounced, with still smaller residual aberrations than in the case of Example 1. This Example 2 demonstrates a form of the invention where every reasonable effort has been made to obtain optimum correction over field, aperture and spectrum despite difficult fabrication.

In the examples of the drawings and description including tabular statements f is the focal length of the mirror and correcting element system, also with the relative pupil or so-called aperture given in usual fashion. Surfaces concave to the incident light have a negative sign. The values $N_D$ are the index of refraction for the D line of the spectrum, while V is the dispersion index of the glass. And as evident from the drawings, R are the radii (contact or central as to the predominantly aspheric members), with the subscribed numerals designating the particular surface in the array. Thicknesses of the illustrated lenses are represented by $t$ and air spaces by S.

The group of correcting elements is disposed with a center of symmetry or approximate symmetry at the center of curvature of the reflecting mirror M, while the resultant image field relieved of the aberrations concerned is represented as at or approximately at the focus of the mirror M.

My calculations show that the residual aberrations in this improved Schmidt system are of the fifth order in the residual astigmatism, of the fifth order in the oblique spherical aberration in the skew direction, and of the seventh and higher orders for the tangential oblique spherical aberration. These aberrations, though present, are very small and far smaller than in the case of the classical Schmidt system, provided the air gaps between the outer and inner aspheric plates of my improved trio of plates are kept more or less equal and small. If the air gap is increased, the aspheric power of the outer plates and therefore of the inner plate can be decreased, since the "lever-arm" is aided by the greater throw. However, in so doing, the residual astigmatism becomes larger than is in keeping with the optical complexity represented by the introduction of the trio of aspheric plates of the present invention and as compared with the preferred optimum combination thereby obtainable.

On the other hand, if the air gap is too small the individual aspheric powers of the trio of plates become unacceptably large and fabrication of such aspheric plates becomes difficult if not impossible with presently available facilities. My calculations to date indicate that the residual higher order astigmatism can be made zero only in the limit as the air gap goes to zero and the aspheric powers become very large. There is a practicable limit in application of the principles of the instant invention. However, this limit depends also on the f/number and the adopted field of view for a given application and may be appreciably smaller than given in either example herein without departing from the spirit of this invention. Similarly, the air gap may be substantially greater than given in the examples herein, if the f/number and field of view are changed. In addition, the "apochromatic pairing" of glass types for the corrector is needed only for cameras utilizing a very great spectral range. For many applications, as for instance where a spectral range of one or two thousand angstroms is involved, a pairing as typified by Example 1 hereof is adequate.

Further, it is not vital that the primary mirror remain spherical. It is indicated by my investigations that the innermost aspheric plate, which is of positive power, in a fully symmetrical trio of plates is too strong at far off-axis angles and in the outermost refractions in the peripheral zones, leading to an oblique under-correction. These extreme rays thus focus short. If the mirror is given a turned down edge in a controlled way, a further compensation may be achieved for an even better ultimate correction. Or the same innermost plate may be made appreciably weaker and some of the correction transferred to the mirror which in such case may then become a turned-up edge on the mirror.

Likewise, it is not absolutely necessary that the trio of plates be fully symmetrical. Actual fabrication may require complete symmetry where cost must be given full weight, but mathematically complete symmetry is not the best answer. Nevertheless, the correction afforded by complete symmetry is so good that the optimum mathematical correction does not lie far away from complete symmetry.

In Example 1 and in Example 2 hereof surfaces $R_1$ and $R_6$ are intended as exactly spherical and identical. Surfaces $R_2$ and $R_5$ are identical in positive aspheric shape. Surfaces $R_3$ and $R_4$ are identical. In all other ways the trio is symmetrical. However, mathematically the aspheric figuring on the outer plates could be placed in part on surfaces $R_1$ and $R_6$ but in doing so a higher cost of fabrication is involved with no comparable benefit gained in return. Nevertheless, the outer plates herein may be and in certain of the appended claims are referred to as aspheric plates, whether one or both surfaces of either is or are aspheric, and such is within the spirit of this invention.

It is mandatory, however, that both surfaces of the central element be aspheric and more or less identical if coma-like errors are to be avoided. But for finite conjugates the symmetry is upset according to the degree of correction required for coma-like errors introduced by the finite throw.

It has been found that all three plates have respective "contact" optical power in the dioptric sense, though weak. The central plate is negative in power throughout, and has a weak "contact" power at the optical axis of negative sign. This introduces negative astigmatism and negative color, both of which are required to balance the contact power and aspheric power of the outer plates for the inclined rays. That is, any chief ray at an off-axis angle necessarily strikes the outer plates at a point off the optical axis where the fourth degree aspheric departure in depth is already appreciable. The aspheric departure of the outer plate then causes astigmatism which only the central negative dioptric power of the central plate can overcome. Color correction then requires that dioptric power be added to all three plates until the astigmatism, ordinary longitudinal aberration and chromatic astigmatism are all satisfied simultaneously.

In the higher orders of aspheric departure something of the same kind of multiple correction is involved. The higher order departure on the outer plates in an aspheric sense is compensated for by the third and higher order aspheric departures aspherically on the central element, both monochromatically and chromatically, until the oblique spherical aberration and higher order astigmatism and their chromatic variants are satisfied simultaneously.

In the practice of the invention a set of non-linear simultaneous equations is solved for a large number of unknowns, where the equations are not necessarily to be precisely satisfied in terms of the aberrations they represent but in general have residuals of the proper sign and magnitude to balance out the higher order uncorrected conditions of the various kinds, toward a final optimum embodiment. In this connection understanding of the invention may be added by considering the classical Schmidt system with its simple correcting plate as though a limiting case or departure point for a trio of plates, say, where the outer plates have zero optical power at every zone and where the central plate is identical with the simple correcting plate of the classical Schmidt. This would amount to the totally uncorrected case. The other extreme case would then be that of full correction as indicated in Examples 1 or 2 for the stated speed and field of view. It is clear that a full sequence of intermediate cases can be interpolated more or less linearly between the two extremes. Thus, in some cases it may be found sufficient to build a system that lies half-way between, and therefore 50 percent corrected, in the interest of having weaker and less costly aspheric plates for some application that may not need the 100 percent correction.

It is also evident from the foregoing that more than three plates may be used without departing from the spirt of this invention. Thus, the outer plates may in practice be compounded into cemented doublets, say, for the purpose of reducing still further some higher order color residuals for some extreme speed and large focal length. Under the invention it is important that on each side of a plane of approximate symmetry, which plane passes through the optical center of the correcting group and is at right angles to the optical axis, there exists a pair of opposing enhanced aspheric refractions, which for rays parallel to the axis before refraction, zone by zone, combine to form a weakly negative aspheric correction and which for strongly inclined rays still combine to be weakly negative with a net negative power adjusted to the needs of correcting the spherical mirror, and which oblique negative power, zone by zone, is appreciably less in absolute value than the oblique negative power of the classical Schmidt plate of the same on-axis net power where for these purposes of comparison we are considering the aspheric negative correction of the classical Schmidt plate which is superimposed on a weakly positive contact or dioptric power. The one pair of aspheric surfaces on the one side affect the lower rays through the pupil and the other pair of aspheric surfaces on the other side of the plane of symmetry affect the upper rays through the pupil, all for an inclined bundle, and working collectively to give a symmetrical type, coma-free correction above and below the chief ray central through the pupil.

Referring again to the drawings, in which FIGS. 1 and 2 respectively accompany Examples 1 and 2, I there show particular embodiments of the invention. In each of these preferred embodiments there is exact symmetry around a central plane, such that the outer plates are identical physically and both convex to the central plane containing the effective stop of the system, and such that the central element is equi-concave and of the same aspheric power, zone by zone, symmetrically. Thus, referring now to the surfaces by the numerals subscribed to the letters R, the surfaces 2 and 3 comprise a pair, and surfaces 4 and 5 comprise another pair of opposed aspheric surfaces, the first pair correcting mostly the lower peripheral rays and the second pair correcting the upper rays through the pupil or aperture, so-called. However, it is emphasized that the system works as a functional whole and must be designed accordingly as a simultaneous solution of multitudinous conditions and unknowns.

Since the term "aspheric" has no definite quantitative meaning it is necessary to consider how the required surfaces are to be represented mathematically. This may be done by assuming each surface to be a surface of revolution such that its cross-section in the meridional plane can be defined by an equation relating the depth of the curve from a tangent plane at the axis to the zone height. Now calling the depth of the curve from the tangent plane (known as the sagitta) the quantity $\xi$ (xi) and the zone height the quantity $\eta$ (eta) with the origin of the curve at the vertex or pole of the surface (the axial point), gives $$\xi = [R - \sqrt{R^2 - \eta^2}] + \beta\eta^4 + \gamma\eta^6 + \delta\eta^8 + \ldots$$
$$(\underset{\uparrow}{+} \text{ if } R \text{ is} -)$$

Here, the part in brackets in an exact expression for the sagitta or depth of a spherical surface, or in cross-section a part of a circle, of radius R. The polynomial terms then represent aspheric departures directly to the designated degree of departure, term by term. The coefficient of the 4th degree term is called the third order term (being 3rd order in the slope, which is the derivative of the polynomial term), the coefficient of the 6th degree term is called the 5th order term, etc.

In the preceding paragraph, noting particularly the equation, and similarly in succeeding statements, $\beta$ (lower case Greek letter beta) is the coefficient of the 4th degree term in the power series, and the subscript denotes the particular surface, as it also does when employed with other symbols herein, as for example subjacent to the $\xi$'s (lower case Greek letter xi) in equations here following. Thus $\beta_2$ refers to the numerical coefficient of the 4th degree term in the power series defining the aspheric shape of surface 2.

For convenience the equivalent focal length of the system is adopted as a unit length and all dimensional quantities are expressed in terms of this unit length. Thereafter, for any given actual system, there is obtained the various data needed by multiplying all dimensional quantities by the focal length in inches or millimeters as desired.

Thus for the aspheric surface 2 in Example 1 the equation of the cross-section curve is:

$$\xi_2 = -5.782 + \sqrt{(-5.782)^2 - \eta^2} - 0.064857\eta^4 + 0.004165\eta^6$$

and for aspheric surface 3 is:

$$\xi_2 = -6.436 + \sqrt{(-6.436)^2 - \eta^2} - 0.091781\eta^4 - 0.014388\eta^6 - 0.008684\eta^8$$

In Example 1 surface 4 is identical with surface 3 except turned around, and surface 5 is identical with surface 2 except turned around.

Similarly in Example 2 the corresponding equation for surface 2 is:

$$\xi_2 = -5.343 + \sqrt{(-5.343)^2 - \eta^2} - 0.151002\eta^4 + 0.047280\eta^6$$

and for surface 3 is:

$$\xi_3 = -6.290 + \sqrt{(-6.290)^2 - \eta^2} - 0.172961\eta^4 + 0.021018\eta^6$$

While again the equations for surfaces 4 and 5 are identical as for surfaces 3 and 2 respectively in this Example 2 except for the positional reversal.

The spherical part of the equation defined generally above, denoted by the term R, is called the "contact" sphere since it is the defining curve at the optical axis. The polynomial terms then define quantitatively the departure of the actual aspheric shape from the contact sphere, zone by zone. Inasmuch as all the above expressions are in terms of the same unit length the optical strengths of the plates at any given zone height can be compared. Indeed, a pertinent ratio basic to the invention is the value of $\beta_2/\beta_3$ and/or of $\beta_5/\beta_4$. In the classical Schmidt case as discussed above the value of each such ratio is obviously zero. In Example 1 the value of the ratios appears as $$\frac{\beta_2}{\beta_3} = \frac{\beta_5}{\beta_4} = 0.707$$

In Example 2 the value of the ratios is $$\frac{\beta_2}{\beta_3} = \frac{\beta_5}{\beta_4} = 0.873$$

The lower order terms are of little importance in this respect since the improvement of the system depends not on these but on the above ratios, although as a consequence of design procedures the lower order terms should have proper values. Similarly, the higher order terms must follow as a result of proper design but are not defining otherwise. Indeed, for any given application both the lower order and higher order terms might be defined in terms of the $\beta$'s, as a consequence of the solution of simultaneous conditions.

It will be understood that the introduction of extra aspheric surfaces, as compared to the classical Schmidt which has only one, would serve little purpose unless some substantial gain can be realized thereby. Therefore in practice a lower limit to the above defined ratio can be taken as 0.25. For some extreme application it might be necessary to go somewhat beyond full correction already found for Examples 1 and 2, wherefore a practical upper limit to the ratio can be taken as 1.000. By taking more than two aspherics on either side of the central plane of symmetry, the ratio may be redefined more generally as the ratio of the $\beta$ of the strongest aspheric shape of positive power to the $\beta$ of the strongest aspheric shape of negative power, on first one side of the central plane and then on the other, with the requirement that each such new ratio must lie numerically in the range between 0.25 and 1.000. This is in keeping with the principles of the invention, since the correction lies in the opposed refractions of strong surfaces that have a collective weak power.

It is particularly here noted that the correcting group of at least three elements in a more or less symmetrical array is useful otherwise than the mere correction of the spherical aberration of a primary mirror. Wherever in compound optical systems it becomes expedient to introduce a classical correcting plate at an aperture stop or conjugate image thereof, a correcting trio or more elaborate array designed in accordance with the present invention may be employed to obtain a wider angular field of good correction. It has already been noted that the net optical effect of the multiple plate group of proper design is approximately the equivalent for on-axis bundles of the optical effect of a classical Schmidt correcting plate. For inclined bundles, however, the optical effect of the classical Schmidt plate grows stronger, zone by zone. The correcting group of more elaborate design as herein disclosed can instead even be of weaker optical effect on inclined bundles than for the on-axis bundles. Here, too, as described above, the effect can adequately be described quantitatively by the ratio of the $\beta$'s on either side of the central plane of symmetry. For the classical Schmidt plate, this ratio is zero. For the correcting groups of this invention the ratio of the $\beta$ for the strongest positive aspheric power to the $\beta$ of the strongest negative aspheric power, on either side of the central plane of approximate symmetry, lies in the range from 0.25 to 1.000. This is herein called the fundamental ratio.

For finite conjugates a similar correcting group of correcting plates or elements may be employed, the plates then preferably being "bent" more or less in a general concave sense around the axial object point of the long conjugate side. The term "bending" is here used in the usual sense of the optical art to signify modifying a lens element directionally one way or the other without changing its net power. Thus, a thin plate can be "bent" into a meniscus shell, either way. A thin lens element can be bent into a meniscus of equivalent power. So under the present invention the correcting elements can be bent into menisci without change of power to favor a finite distant object plane and thereby minimize the surface to surface refractions, consistent with requirements imposed by overall considerations in the given instance. The desirable amount of the bending depends on the field of view and conjugate ratio. The previously mentioned central "plane" of approximate or exact symmetry for finite conjugates thus becomes a concave surface with a center of curvature on the long conjugate side. True symmetry no longer prevails, but nevertheless having first adopted the symmetrical situation with a central plane of approximate symmetry, the entire array may then be bent appropriately in a general concave sense around the long conjugate. In all other respects the principles of the correcting trio or more elaborate form thereof are closely the same for the case of finite conjugates as for the case of an infinite distance on the long conjugate side.

Reference herein to average oblique power of correcting lens components is to the mean effect of the zones of such component group other than for on-axis bundles.

It will be understood that my invention, either as to method or apparatus, is not limited to the exemplary embodiments or steps herein illustrated or described, and I set forth its scope in my following claims.

I claim:

1. An optical system corrected for longitudinal and lateral chromatic aberration, spherical aberration, coma, astigmatism, and the chromatic variations of spherical aberration, coma and astigmatism, and for oblique spherical aberration in tangential and radial directions, on a curved field, said system comprising an array of at least three aspheric correcting lens components disposed about symmetrically around an optical center substantially at the real stop of the system, which optical center lies approximately at the center of curvature of a primary mirror having predominantly spherical shape, said correcting components presenting at least two distinct aspheric surfaces on each side of a central plane of symmetry, the conditions of symmetry being closely met, said aspheric surfaces in pairs being separated by an axial distance not exceeding 0.3 of the equivalent focal length of the system as a whole, said components having individual axial thicknesses not exceeding 0.15 of the focal length, said correcting components as a group having a total axial extent not exceeding 0.7 of the focal length of the entire system, said correcting group having at least two kinds of glass in terms of a difference in V-value, said difference lying between 3 and 25, and the system having a curved field of approximately spherical form, the radius of curvature at any given part of the field lying within 10 percent of the equivalent focal length of the system, said pairs of aspheric surfaces on each side of the central plane of symmetry having numerical values and ratios for the ratio of the coefficients of the 4th degree aspheric terms defining their cross-sections in the meridional plane lying in the range from 0.25 to 1.000, where the coefficient taken in the numerator for each pair is for the aspheric surface farther from the central plane of symmetry.

2. An optical system as defined in claim 1 in which the correcting group consists of three air-spaced aspheric components with the central component of one kind of glass and the outer component on each side of another kind of glass, where the V-values differ and the difference lies in the range from 3 to 25.

3. An optical system as defined in claim 2 in which exact symmetry is maintained in the trio of aspheric components, such that the central component is equi-concave zone by zone, though aspheric, and the outer components are identical in shape but opposed and containing the central component between them with equal air spaces.

4. An optical system as defined in claim 3 where apochromatic pairing of glass types is obtained such that the longitudinal color aberration for a mean zone is fully corrected for at least three widely separated colors of the spectrum, such that the central element has the higher V-value and that the relative partial dispersions substantially agree for the different kinds of glass involved.

5. An optical system as defined in claim 4 where the primary mirror is of spherical shape over its entire useful surface.

6. An optical system having substantially the following data of construction wherein $N_D$ is the index of refraction for the D-line of the spectrum; V is the dispersion index of the glass; $f$ is the equivalent focal length of the system; $f/1.0$ is the so-called aperture-ratio; $t_1$, $t_2$, $t_3$ are the respective glass thicknesses at the optical axis; $S_1$, $S_2$, $S_3$ refer to the separation of vertices, that is, the air spacings, along the optical axis; Greek letter $\xi$ (xi) is the sagittal depth and $\eta$ (eta) is the zone height; and the $\beta$'s are the coefficients of the respective fourth degree terms of the equations:

*Example 1*
[$f/1.0 \quad f=1.000$]

| Lens | Glass | | Radii[1] | Thicknesses |
|---|---|---|---|---|
| | $N_D$ | V | | |
| I | 1.5497 | 45.8 | $R_1=-21.014$ | $t_1=0.053$ |
| | | | $R_2=-5.782$ | $S_1=0.216$ |
| | | | $R_3=-6.436$ | $t_2=0.032$ |
| II | 1.6110 | 58.8 | $R_4=\phantom{-}6.436$ | $S_2=0.216$ |
| | | | $R_5=\phantom{-}5.782$ | $t_3=0.053$ |
| III | 1.5497 | 45.8 | $R_6=\phantom{-}21.014$ | $S_3=1.832$ |
| M | | | $R_7=-2.1014$ | |

[1] $R_1$, $R_6$ and $R_7$ herein are spherical; $R_2$, $R_3$, $R_4$ and $R_5$ are contact or central radii only and are predominantly aspheric.

and wherein the equations of the cross-section curves are:

Aspheric surface (2)
$$\xi_2=-5.782+\sqrt{(-5.782)^2-\eta_2^2}\\-0.064857\eta_2^4+0.004165\eta_2^6$$

Aspheric surface (3)
$$\xi_3=-6.436+\sqrt{(-6.436)^2-\eta_3^2}-0.091781\eta_3^4\\-0.014388\eta_3^6-0.008684\eta_3^8$$

Aspheric surface (4)
$$\xi_4=+6.436-\sqrt{-6.436)^2-\eta_4^2}+0.091781\eta_4^4\\+0.014388\eta_4^6+0.008684\eta_4^8$$

Aspheric surface (5)
$$\xi_5=+5.782-\sqrt{(5.782)^2-\eta_5^2}+0.064857\eta_5^4-0.004165\eta_5^6$$

and wherein the numerical value for the ratio of the coefficients of the 4th degree power series terms defining the aspheric cross-section in the meridional plane lie in the range from 0.25 to 1.000, namely in this example the fundamental ratio: $\beta_2/\beta_3=0.707$, $\beta_5/\beta_4=0.707$.

7. An optical system having substantially the following data of construction wherein $N_D$ is the index of refraction for the D-line of the spectrum; V is the dispersion index of the glass; $f$ is the equivalent focal length of the system; $f/1.0$ is the so-called aperture-ratio; $t_1$, $t_2$, $t_3$ are the respective glass thicknesses at the optical axis; $S_1$, $S_2$, $S_3$ refer to the separation of vertices, that is, the air spacings, along the optical axis; Greek letter $\xi$ (xi) is the sagittal depth and $\eta$ (eta) is the zone height; and the $\beta$'s are the coefficients of the respective fourth degree terms of the equations:

*Example 2*
[$f/1.0 \quad f=1.000$]

| Lens | Glass | | Radii[1] | Thicknesses |
|---|---|---|---|---|
| | $N_D$ | V | | |
| I | 1.55772 | 53.83 | $R_1=-25.63$ | $t_1=0.051$ |
| | | | $R_2=-5.343$ | $S_1=0.103$ |
| | | | $R_3=-6.290$ | $t_2=0.031$ |
| II | 1.60302 | 60.67 | $R_4=\phantom{-}6.290$ | $S_2=0.103$ |
| | | | $R_5=\phantom{-}5.343$ | $t_3=0.051$ |
| III | 1.55772 | 53.83 | $R_6=\phantom{-}25.63$ | $S_3=1.902$ |
| M | | | $R_7=-2.0505$ | |

[1] $R_1$, $R_6$ and $R_7$ herein are spherical; $R_2$, $R_3$, $R_4$ and $R_5$ are contact or central radii only and are predominantly aspheric.

and wherein the equations of the cross-section curves are:

Aspheric surface (2)
$$\xi_2=-5.343+\sqrt{(-5.343)^2-\eta_2^2}\\-0.151002\eta_2^4+0.047280\eta_2^6$$

Aspheric surface (3)
$$\xi_3=-6.290+\sqrt{(-6.290)^2-\eta_3^2}\\-0.172961\eta_3^4+0.021018\eta_3^6$$

Aspheric surface (4)
$$\xi_4=+6.290-\sqrt{(6.290)^2-\eta_4^2}\\+0.172961\eta_4^4-0.021018\eta_4^6$$

Aspheric surface (5)
$$\xi_5=+5.343-\sqrt{(5.343)^2-\eta_5^2}\\+0.151002\eta_5^4-0.047280\eta_5^6$$

and wherein the numerical value for the ratio of the coefficients of the 4th degree power series terms defining the aspheric cross-section in the meridional plane lie in the range from 0.25 to 1,000, namely in this example the fundamental ratios: $\beta_2/\beta_3=0.873$, $\beta_5/\beta_4=0.873$.

8. An optical system corrected for longitudinal and lateral chromatic aberration, coma, astigmatism, and the chromatic variations of spherical aberration, coma and astigmatism, having an appreciable net spherical aberration, to be used as a corrector located at least near any pupil of an associated optical system, said system comprising an array of at least three aspheric correcting lens elements disposed substantially symmetrically around an optical center, said correcting elements having at least two distinct monotonically aspheric surfaces on each side of a central plane of symmetry, said aspheric surfaces in pairs being air-spaced by an axial distance not to exceed 0.3 of the equivalent focal length of the combined system, said elements having individual axial thicknesses not exceeding 0.15 of the focal length of the combined system, said correcting elements as a group having a total axial extent not exceeding 0.7 of the equivalent focal length of the combined system, said correcting group having at least two kinds of glass in terms of a difference in V-value, said difference lying between 3 and 25, said pairs of aspheric surfaces on each side of the central plane of symmetry having a numerical value for the ratio of the 4th order aspheric terms defining their cross-sections in the meridional plane lying in the range from 0.25 to 1.000, the coefficient taken in the numerator for each pair being that for the monotonic aspheric surface farther from the central plane of symmetry.

9. An optical system as in claim 8 in which the correcting group consists of three air-spaced aspheric elements with the central element of one kind of glass and the outer element on each side of another kind of glass, where the V-values differ, said difference lying in the range from 3 to 25.

10. An optical system as defined in claim 9 in which exact symmetry is maintained in the trio of elements, such that the central element is equi-concave zone by zone, though aspheric, and the outer elements are identical in shape but opposed and containing the central element between them with equal air spaces.

11. An optical system as in claim 10 where apochromatic pairing of glass types is obtained such that the longitudinal color aberration for a mean zone is fully corrected for at least three widely separated colors of the spectrum, such that the central element has the higher V value and that the relative partial dispersions substantially agree for the different kinds of glass involved.

12. An optical system as in claim 8 incorporating finite conjugates together with a "bending" of the elements around the long conjugate and where the central plane of symmetry "bends" into a concave surface of approximately the same curvature and sense of curvature as for the wave front from and centered at the immediately preceding axial object point incident on the correcting system.

13. A correcting lens system for location with respect to the center of curvature of a predominantly spherical reflecting surface, comprising at least three correcting lens components with average oblique power smaller numerically than for on-axis bundles, said components air-spaced and axially aligned in a single cell presenting at each side of a transverse central plane of general symmetry one outside and two inside surfaces, at least the inside surfaces being aspheric, said inside aspheric surfaces at each side of said plane being different from each other at the respective side but being of the same algebraic sign in aspheric depth zone by zone with reference to the respective tangent planes at the respective vertices, said aspheric surfaces having a numerical value for the ratio of the coefficients of the 4th degree aspheric terms defining their cross-sections in the meridional plane lying in the range from 0.25 to 1.000, where the coefficient taken in the numerator for each pair is for the aspheric surface farther from the central plane of symmetry.

14. A correcting lens system for location with respect to the center of curvature of a predominantly spherical reflecting surface, comprising at least three correcting lens components with average oblique power smaller numerically than for on-axis bundles, said components air-spaced and axially aligned in a single cell presenting at each side of a transverse central plane of general symmetry one outside and two inside surfaces, at least the inside surfaces being monotonically aspheric and differing from each other at the same side of said plane and each having a counterpart at the opposite side of said plane, that aspheric surface lying farther from the central plane of symmetry, though monotonic in depth from the axis outward to its periphery, having weaker optical power zone by zone than the monotonic aspheric surface paired with it and nearer the central plane of symmetry, and both monotonically aspheric surfaces in pairs on each side of the plane of symmetry having optical power of the same sign, zone by zone said aspheric surfaces having a numerical value for the ratio of the coefficients of the 4th degree aspheric terms defining their cross-section in the meridional plane lying in the range from 0.25 to 1.000, the coefficient taken in the numerator for each of said surface pairs being for the aspheric surface farther from the central plane of symmetry.

15. A correcting lens system for location with respect to the center of curvature of a predominantly spherical reflecting surface, comprising at least three correcting lens components with average oblique power smaller numerically than for on-axis bundles, said components air-spaced and axially aligned in a single cell presenting at each side of a transverse central plane of general symmetry one outside and two inside surfaces, at least the inside surfaces being monotonically aspheric, there being two differing forms of aspheric inside surfaces, one of each form at each side of said central plane of symmetry, that aspheric surface lying farther from the central plane of symmetry, though monotonic in depth from the axis outward to its periphery, having weaker optical power zone by zone than the monotonic aspheric surface paired with it and nearer the central plane of symmetry, and both monotonically aspheric surfaces in pairs on each side of the plane of symmetry having optical power of the same sign, zone by zone said aspheric surfaces having a numerical value for the ratio of the coefficients of the 4th degree aspheric terms defining their cross-sections in the meridional plane lying in the range from 0.25 to 1.000, the coefficient taken in the numerator for each of said surface pairs being for the aspheric surface farther from the central plane of symmetry.

16. A correcting lens system for location with respect to the center of curvature of a predominantly spherical reflecting surface, comprising at least three correcting lens components with average oblique power smaller numerically than for on-axis bundles, said components air-spaced and axially aligned in a single cell presenting at each side of a transverse central plane of general symmetry one outside and two inside surfaces, at least the inside surfaces being monotonically aspheric, there being two differing forms of aspheric inside surfaces, one of each form at each side of said central plane of symmetry, those aspheric surfaces nearer said plane being alike and those farther from said plane being alike, that aspheric surface lying farther from the central plane of symmetry, though monotonic in depth from the axis outward to its periphery, having weaker optical power zone by zone than the monotonic aspheric surface paired with it and nearer the central plane of symmetry, and both monotonically aspheric surfaces in pairs on each side of the plane of symmetry having optical power of the same sign, zone by zone said aspheric surfaces having a numerical value for the ratio of the coefficients of the 4th degree aspheric terms defining their cross-sections in the meridional plane lying in the range from 0.25 to 1.000, the coefficient taken in the numerator for each of said surface pairs being for the aspheric surface farther from the central plane of symmetry.

17. A correcting lens system for location with respect to the center of curvature of a predominantly spherical reflecting surface, comprising at least three correcting lens components with average oblique power smaller numerically than for on-axis bundles, said components air-spaced and axially aligned in a single cell presenting at each side of a transverse central plane of general symmetry one outside and two inside surfaces, at least the inside surfaces being monotonically aspheric, there being two differing forms of aspheric inside surfaces, one of each form at each side of said central plane of symmetry, those aspheric surfaces nearer said plane being alike and those farther from said plane being alike and the like surfaces being oppositely disposed, that aspheric surface lying farther from the central plane of symmetry, though monotonic in depth from the axis outward to its periphery, having weaker optical power zone by zone than the monotonic aspheric surface paired with it and nearer the central plane of symmetry, and both monotonically aspheric surfaces in pairs on each side of the plane of symmetry having optical power of the same sign, zone by zone said aspheric surfaces having a numerical value for the ratio of the coefficients of the 4th degree aspheric terms defining their cross-sections in the meridional plane lying in the range from 0.25 to 1.000, the coefficient taken in the numerator for each of said surface pairs being for the aspheric surface farther from the central plane of symmetry.

18. A correcting lens system for use approximately at the center of curvature of a predominantly spherical reflecting surface, comprising at least three lens elements each with at least one aspheric surface, said elements airspaced and substantially symmetrically disposed around an optical center contained in a central plane of general symmetry, there being at least two different monotonically aspheric surfaces on each side of said central plane of symmetry, those two aspheric surfaces nearer said plane being alike and those two surfaces farther from said plane being alike, that aspheric surface lying farther from the central plane of symmetry, though monotonic in depth from the axis outward to its periphery, having weaker optical power zone by zone than the monotonic aspheric surface paired with it and nearer the central plane of symmetry, and both monotonically aspheric surfaces in pairs on each side of the plane of symmetry having optical power of the same sign, zone by zone said aspheric surfaces having a numerical value for the ratio of the coefficients of the 4th degree aspheric terms defining their cross-sections in the meridional plane lying in the range from 0.25 to 1.000, the coefficient taken in the numerator for each of said surface pairs being for the aspheric surface farther from the central plane of symmetry.

19. A correcting lens system for use approximately at the center of curvature of a predominantly spherical reflecting surface, comprising at least three lens elements each with at least one aspheric surface, said elements airspaced and substantially symmetrically disposed around an optical center contained in a central plane of general symmetry, there being at least two different monotonically aspheric surfaces on each side of said central plane of symmetry, the like aspheric surfaces being oppositely disposed at the respective sides of the central plane, that aspheric surface lying farther from the central plane of symmetry, though monotonic in depth from the axis outward to its periphery, having weaker optical power zone by zone than the monotonic aspheric surface paired with it and nearer the central plane of symmetry, and both monotonically aspheric surfaces in pairs on each side of the plane of symmetry having optical power of the same sign, zone by zone said aspheric surfaces having a numerical value for the ratio of the coefficients of the 4th degree aspheric terms defining their cross-sections in the meridional plane lying in the range from 0.25 to 1.000, the coefficient taken in the numerator for each of said surface pairs being for the aspheric surface farther from the central plane of symmetry.

20. A correcting lens system for use approximately at the center of curvature of a predominantly spherical reflecting surface, comprising at least three lens elements each with at least one aspheric surface, said elements airspaced and substantially symmetrically disposed around an optical center contained in a central plane of general symmetry, there being at least two different monotonically aspheric surfaces on each side of said central plane of symmetry, each aspheric surface at one side of said plane being like one of those at the other side, that aspheric surface lying farther from the central plane of symmetry, though monotonic in depth from the axis outward to its periphery, having weaker optical power zone by zone than the monotonic aspheric surface paired with it and nearer the central plane of symmetry, and both monotonically aspheric surfaces in pairs on each side of the plane of symmetry having optical power of the same sign, zone by zone said aspheric surfaces having a numerical value for the ratio of the coefficients of the 4th degree aspheric terms defining their cross-sections in the meridional plane lying in the range from 0.25 to 1.000, the coefficient taken in the numerator for each of said surface pairs being for the aspheric surface farther from the central plane of symmetry.

References Cited in the file of this patent

UNITED STATES PATENTS

| | | |
|---|---|---|
| 2,380,888 | Warmisham | July 31, 1945 |
| 2,551,852 | Rinia | May 8, 1951 |
| 2,596,799 | Tillyer et al. | May 13, 1952 |

FOREIGN PATENTS

| | | |
|---|---|---|
| 1,051,664 | France | Sept. 16, 1953 |

UNITED STATES PATENT OFFICE
CERTIFICATION OF CORRECTION

Patent No. 3,022,708                                  February 27, 196

James G. Baker

It is hereby certified that error appears in the above numbered patent requiring correction and that the said Letters Patent should read as corrected below.

Column 2, line 12, for "exitsence" read -- existence --; column 3, line 50, for "longituidnal" read -- longitudinal --; column 4 and column 11, under "Example I", and column 5 and column 12, under "Example 2", Radii $R_1$ and $R_2$ should be grouped together opposite Lens I; Radii $R_3$ and $R_4$ should be grouped together opposite Lens II; Radii $R_5$ and $R_6$ should be should be grouped together opposite Lens III, all to be same as on corresponding drawing sheets I and II; column 11, lines 47 and 48, for "$-\pi_2 2$" read -- $-\hbar_2 2$ --; lines 56 and 57, for "$-6.436)^2$" read -- $(6.436)^2$ --; column 12, line 42, for "0.25 to 1,000" read -- 0.25 to 1.000 --.

Signed and sealed this 26th day of June 1962.

(SEAL)
Attest:

ERNEST W. SWIDER
Attesting Officer

DAVID L. LADD
Commissioner of Patents